Aug. 20, 1957 H. H. HOLLY 2,803,458
SHEET FEEDING MEANS FOR MOLDING DEVICE
Filed June 11, 1953 7 Sheets-Sheet 1

Inventor:
Harry H. Holly,

Aug. 20, 1957     H. H. HOLLY     2,803,458
SHEET FEEDING MEANS FOR MOLDING DEVICE
Filed June 11, 1953     7 Sheets-Sheet 3

Aug. 20, 1957  H. H. HOLLY  2,803,458
SHEET FEEDING MEANS FOR MOLDING DEVICE
Filed June 11, 1953  7 Sheets-Sheet 5
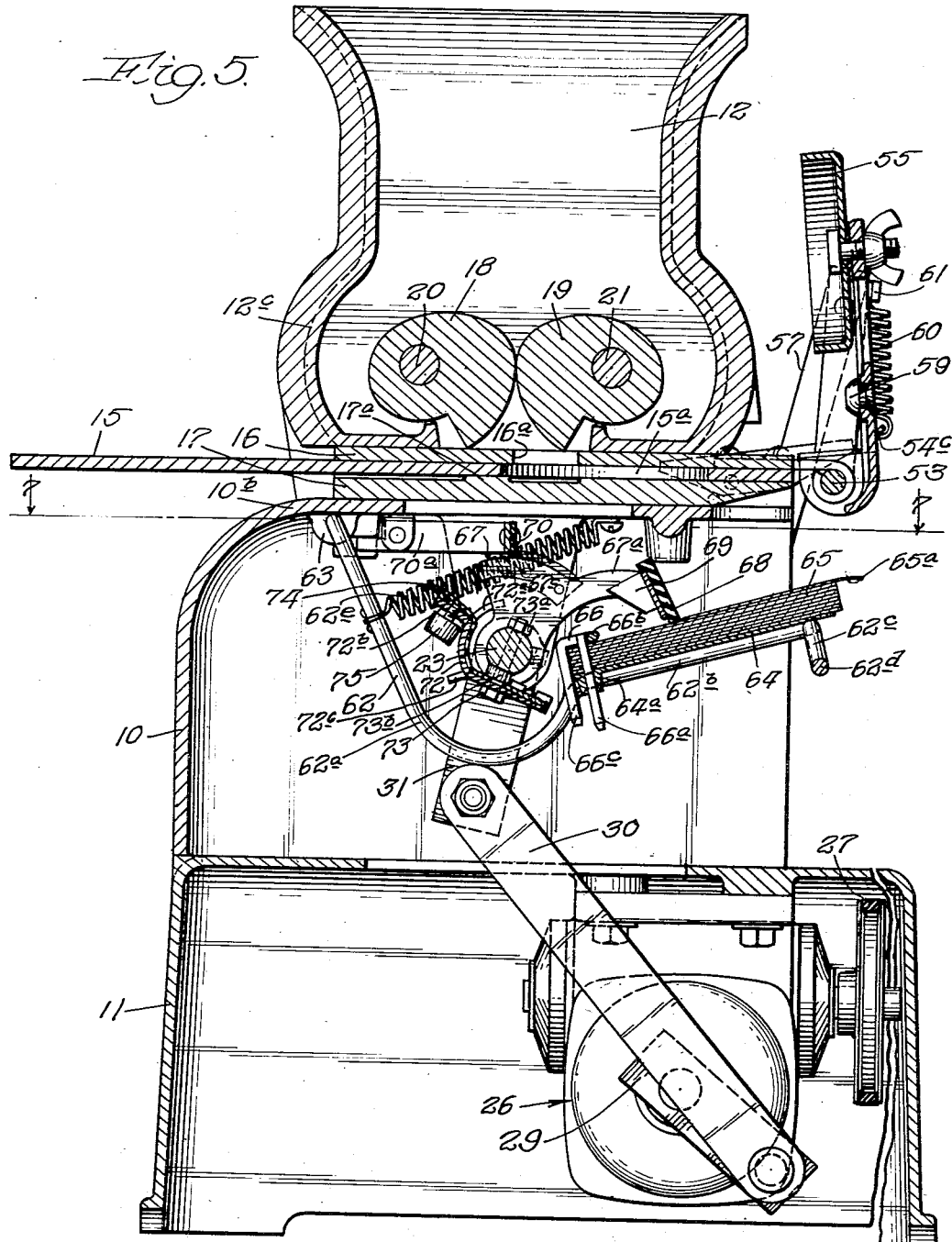

Aug. 20, 1957     H. H. HOLLY     2,803,458
SHEET FEEDING MEANS FOR MOLDING DEVICE
Filed June 11, 1953     7 Sheets-Sheet 6
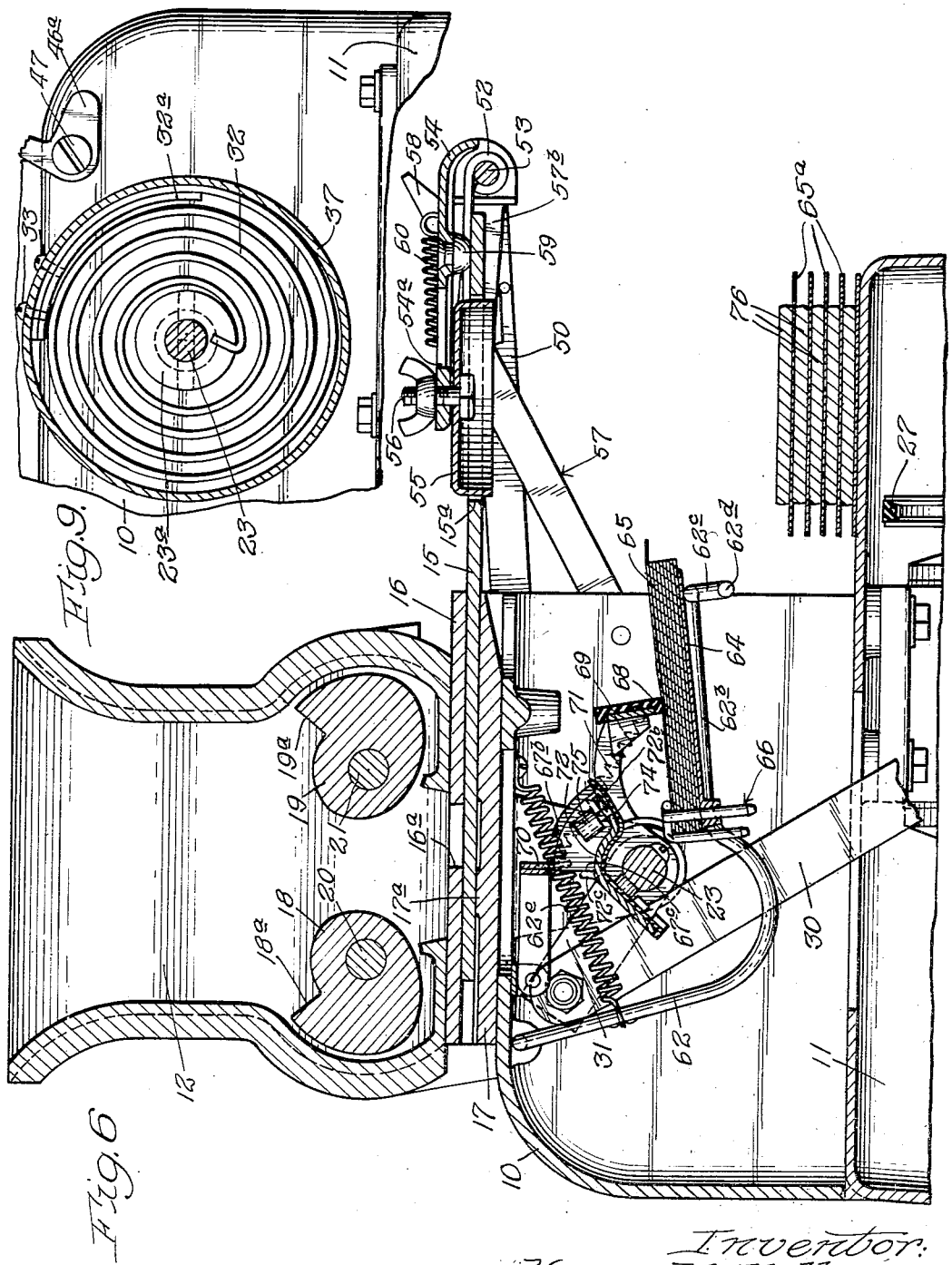

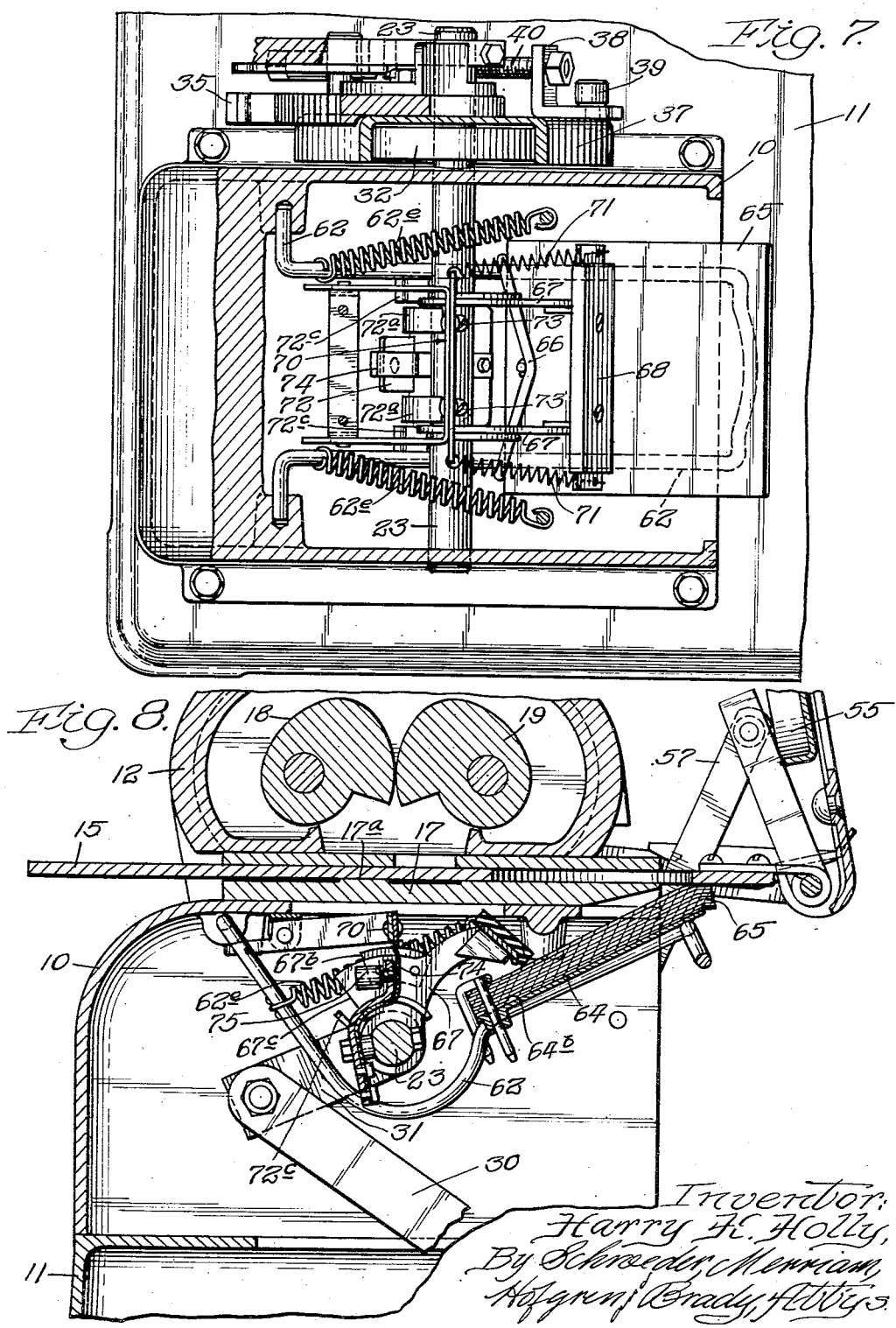

United States Patent Office 2,803,458
Patented Aug. 20, 1957

2,803,458

SHEET FEEDING MEANS FOR MOLDING DEVICE

Harry H. Holly, Chicago, Ill., assignor to Hollymatic Corporation, a corporation of Illinois Application June 11, 1953, Serial No. 360,866

8 Claims. (Cl. 271—10)

This invention relates to an apparatus for molding a plastic material such as ground meat to form articles such as meat patties.

One of the features of this invention is to provide an apparatus for use in a device for applying a separator sheet to a plastic material within a mold opening into which the plastic material is received and from which it is discharged with the apparatus comprising, a mounting means supporting the mold member, a platform on the mounting means adjacent to the mold member and adapted releasably to support a stack of separator sheets, an elongated arm attached to the platform and hingedly attached to the mounting means with the arm being oscillatable about its hinge in moving the platform toward and away from the mold member, a movable friction member on the mounting means bearing against a topmost separator sheet on the supporting member, means operably associated with the platform and urging the platform toward the mold member, means operably associated with the friction member for moving the friction member and thus the platform away from the mold member and simultaneously to move the topmost sheet forwardly into edge projecting position and means releasing the friction member to permit the platform and arm to move toward the mold member about the hinge and contact the leading edge of the sheet against the mold member.

A further object of the invention is to provide an apparatus including a movable sheet supporting platform, as oscillatable member adjacent to the platform, means for simultaneously moving the mold member and oscillating the oscillatable member, a friction member mounted for rotation relative to the oscillatable member and bearing against the topmost sheet on the supporting member and means holding the friction member in a position pressing the platform into a retracted position and engaged by a release member on the oscillatable member for releasing the holding means to permit the platform to move upwardly and contact the mold member, the release member being adjustable relative to the holding means for regulating the time of the releasing relative to the movement of the mold member.

Another feature of the invention is the provision of a molding apparatus including a separator sheet supporting platform having an opening adjacent to the rear edge thereof and a paper retaining member having a pin portion adapted to engage a stack of sheets on the platform and extend into the opening, the retaining member having an upper portion adapted to engage the top rear part of the stack and a rear portion adapted to engage the rear edge of the stack and the platform.

Yet another feature of the invention is the provision of a molding apparatus including a hopper for the material having a feed exit, a mold adapted to receive material thru the exit, a feeder in the hopper movable toward and away from the exit to force material into the mold, operating apparatus for thusly moving the feeder, and linkage means including meshing gears of varying radii operably associated with the operating apparatus and feeder for increasing the power exerted on the feeder when the feeder is in a position adjacent to the exit, and for increasing the speed of movement of the feeder when the feeder is in a position spaced from the exit.

A still further feature of the invention is the provision of a molding apparatus including a feeder in a hopper, movable toward and away from an exit to force material therethrough into a mold, a movable member, linkage apparatus operably connecting the feeder and the movable member for causing the movement of the feeder on movement of the movable member, spring means forming a part of the linkage apparatus and tensed to exert a predetermined force on the feeder when the feeder is moved toward the exit, and means for adjusting the tension of the spring to any desired value of its entire tension range to predetermine the force applied through the feeder on the material fed into the mold.

Another feature of the invention is the provision of a molding apparatus including the feeder, oscillatable member, linkage apparatus operably connected to the feeder, a stress spring operably connecting the oscillatable member and the linkage apparatus to provide a predetermined force on the feeder when moving the feeder toward the exit, and a releasable catch nullifying the spring and directly connecting the oscillatable member and linkage apparatus for movement as a unit only during the initial portion of the feeder movement toward the exit and when the feeder is spaced a relatively great distance therefrom. Other features and advantages of the invention will be apparent from the following description of one embodiment of the invention taken in conjunction with the accompanying drawings.

Of the drawings:

Figure 5 is a sectional elevational view taken substantially along line 5—5 of Figure 3.

Figure 6 is a view similar to Figure 5 but with the mold plate in substantially fully extended position.

Figure 7 is a sectional plan view taken substantially along line 7—7 of Figure 5.

Figure 8 is a view somewhat similar to Figure 5 but with the mold plate advanced from the position shown in Figure 5.

Figure 9 is a fragmentary sectional elevation taken substantially along line 9—9 of Figure 2.

Figure 1:
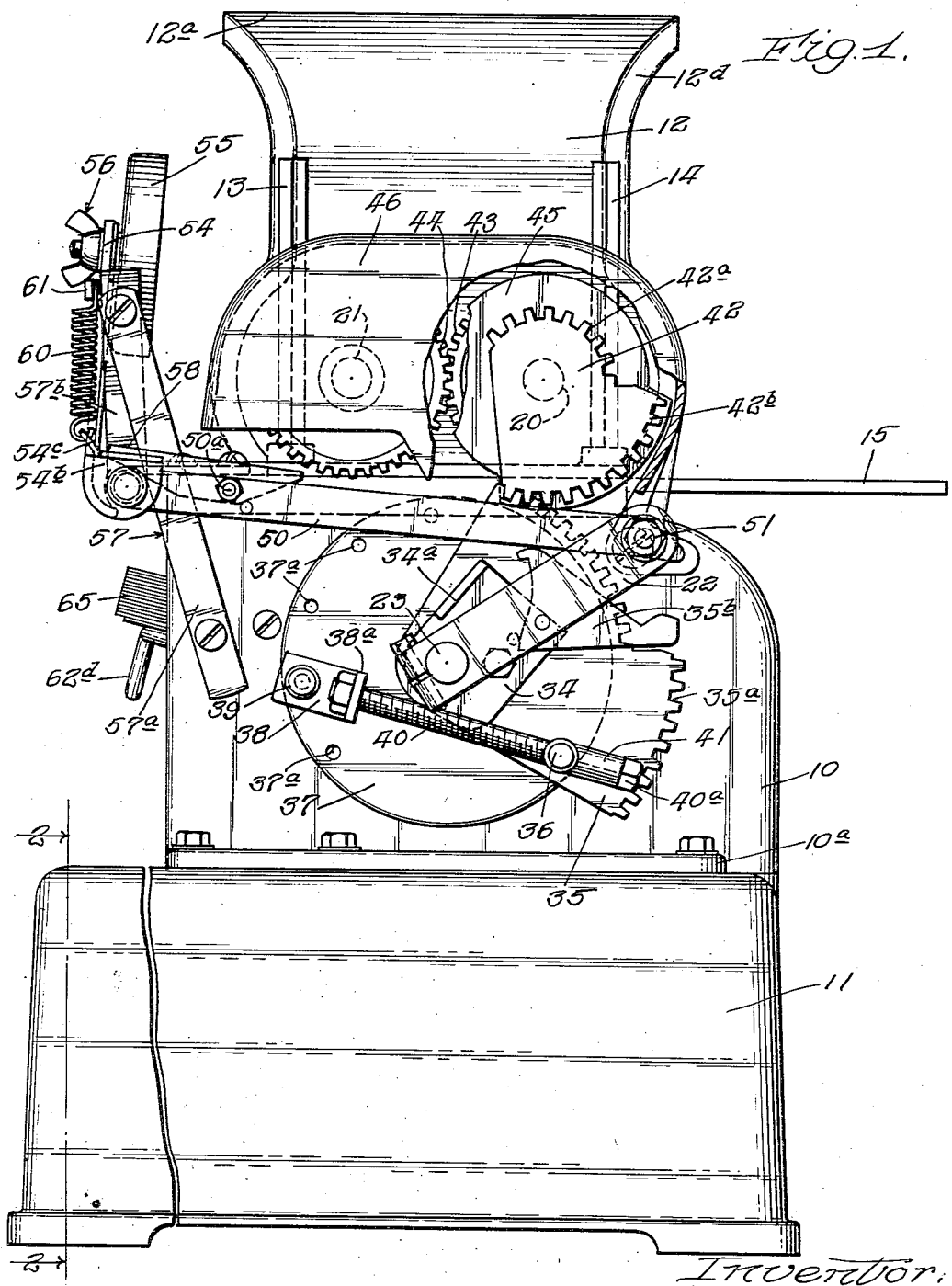
Figure 1 is a side elevation, partially broken away for clarity of illustration, of one embodiment of the invention with the mold plate in substantially fully retracted position.

The invention disclosed and claimed herein is an improvement over the invention disclosed and claimed in my copending application Serial No. 284,355 filed April 25, 1952, now Patent 2,706,830, dated April 26, 1955. Many of the features disclosed in the present application are claimed in this copending application.

As can be seen in the drawings the molding apparatus embodiment illustrated therein is provided with a lower casing 10 that is adapted to be bolted by means of a base flange 10a to a table or other support or to the top of a casing 11 that may house an electrically operated drive mechanism when the apparatus is to be electrically driven. On the top of the lower casing 10 there is provided a hopper 12 which is adapted to contain a moldable material such as ground meat for making hamburger patties or sausage patties, ground fish for making fish patties and other moldable materials which may or may not be food materials. The hopper is provided with an upwardly flaring open top 12a, a flanged base 12b, outwardly flaring end portions 12c at the bottom thereof and end reenforcing ribs 12d. The flanged base 12b is adapted to be removably attached to the top portion 10b of the casing 10 by front and rear bolts 13 and 14, respectively.

Located between the bottom 12b of the hopper 12 and the top 11a of the casing 11 is a substantially horizontal mold plate 15 having a mold opening 15a therein. This mold opening may be circular, square or any other desired shape. The mold plate is separated from the base 12b of the hopper by an auxiliary plate 16 that is provided with an exit opening 16a adapted to communicate with the mold opening 15a so that material may be fed therethrough from the hopper into the mold opening. As is explained in my copending application Serial No. 284,355, the mold plate 15 slides within a groove in a second auxiliary plate 17 that rests on top of the casing 10. This second auxiliary plate is provided with a transverse raised portion 17a immediately to the rear of the exit opening 16a. This raised rib serves to reduce the frictional drag of the mold plate 15 and aids in filling completely the mold opening 15a. The provision of the second auxiliary plate 17 permits interchanging mold plates 15 of varying thicknesses and having different sized or shaped mold openings 15a so that a pattie having predetermined desired characteristics may be produced.

In order to feed material from the hopper 12 through the opening 16a into the mold opening 15a, there are provided a pair of oscillatable feeders 18 and 19 mounted for oscillation on shafts 20 and 21 respectively. The feeder 18 is provided with a ram portion 18a and the feeder 19 is provided with a similar ram portion 19a. As can be seen in Figs. 5 and 6, these ram portions are extended parts of the periphery of the feeders so as to provide a step construction when the feeders are in the position shown in Fig. 6. With the ram portions 18a and 19a furtherest from the exit opening 16a, the feeders are in position preparatory to forcing material through this exit opening. When the feeders have been rotated from the position shown in Fig. 6 to the positions shown in Fig. 5, they will have exerted pressure on the material within the hopper to force an amount of material through this exit sufficient to fill the mold opening 15a. The construction and operation of such a feeding arrangement is described more fully and is claimed in my prior Patent 2,530,061, dated November 14, 1950.

In order to operate the molding device of this invention, there is provided a lever 22 and shaft 23 combination with the lever being mounted on the shaft and the two being oscillatable as a unit. The shaft 23 extends through the front side of the casing 11 and the lever 22 may have mounted thereon a hand lever (not shown) of the type disclosed in the above mentioned prior Patent 2,706,830. This hand lever is used for hand operation of the device and is then removed from the lever 22 when the device is motor operated. In the embodiment shown in the drawings the device is arranged for motor operation.

The motor drive portion of the apparatus is located within the casing 11. This motor drive portion includes an electric motor 24 whose operation is controlled by means of a switch 25 in the electric circuit to the motor. The motor drives a gear reducer 26 through a pulley and belt 27 arrangement. The main shaft 28 of the gear reducer has mounted thereon a rotatable arm 29 so that this arm is rotated with the shaft. Rotatably attached to the outer end of this arm 29 is one end of a pitman 30 which extends up into the casing 10. The upper end of this pitman has rotatably attached thereto one end of a drive arm 31 whose other end is attached to the shaft 23. With this arrangement, therefore, rotation of the arm 29 causes reciprocation of the pitman 30 and oscillation of the drive arm 31 and shaft 23.

Although the device as shown in the drawings is arranged for motor operation it may be readily converted to hand operation by merely detaching the upper end of the pitman 30 from the drive arm 31 and by attaching a hand lever (not shown) to the lever 22. Whether the device is operated by electric power or by hand the lever 22 is oscillated between the positions shown in Figs. 1 and 4, for example, in driving the device. In order to simplify the description, the device will be further described as if it were motor operated although hand operation can, of course, be used if desired.

Rotatably attached to the shaft 23 is a small plate 34 provided with an outwardly projecting flange 34a that is arranged to be abutted by the forward edge of the lever 22 when the lever moves from right to left as shown in Fig. 1. This plate 34 is bolted or otherwise attached to a gear sector 35. This gear sector is also rotatably mounted on the shaft 23. Extending outwardly from the lower part of this gear sector is an apertured stud 36.

Between the member 35 and the adjacent side of the casing 10, there is provided a flat, substantially cylindrical casing 37 containing a coil spring 32. This spring is an ordinary flat steel spring coiled upon itself as shown in Fig. 9 and having its outer end attached to the edge of the casing 37 by means of screws 33 and a spring plate 32a. The inner end of the spring 32 is operably attached to the shaft 23 by means of a collar 23a which is engaged by the extreme inner end of the spring. The spring casing 37 is rotatable on the shaft 23 and is provided with spaced holes 37a arcuately arranged adjacent to the edge of the casing. These holes are provided so that the tension of the spring may be predetermined by engaging a selected hole with a bracket 38 held in place on the casing by a removable pin 39 having a knurled outer end so that the pin may be easily screwed into and out of a selected hole 37a. The adjustment is accomplished by providing an adjustment bolt 40 extending between a flange 38a on the bracket 38 and the aperture stud 36 and through which this bolt 40 extends. The stud 36 is pivotally mounted on the gear sector 35 and the outer end of the bolt 40 is provided with a collar 41 extending between the head 40a on the end of the bolt 40 and the aperture stud 36. As can be seen with this arrangement the rotatable casing 37 is tied to the rotatable gear sector 35 by means of the adjustable bolt 40. As the spring 32 is rotated with the shaft 23, the rotation of the spring drives the casing 37 and thus the gear sector 35. The spring force that causes this rotation of the gear sector is adjusted by adjusting the tension on the spring which is accomplished by regulating the length of the bolt 40.

The gear sector 35 is divided into two gear segments 35a and 35b. The first segment 35a has a radius that is considerably greater than the radius of the segment 35b. The gear sector 35 engages a second gear 42. This gear is mounted for rotation with the feeder carrying shaft 20. This gear likewise has two segments 42a and 42b. The first gear segment 42a has a relatively small radius and is adapted to be engaged by the gear segment 35a which has a relatively large radius. Similarly, the segment 42b, which has a relatively large radius compared to that of segment 42a, is adapted to engage gear segment 35b which has a relatively small radius compared to that of 35a.

Figure 2:
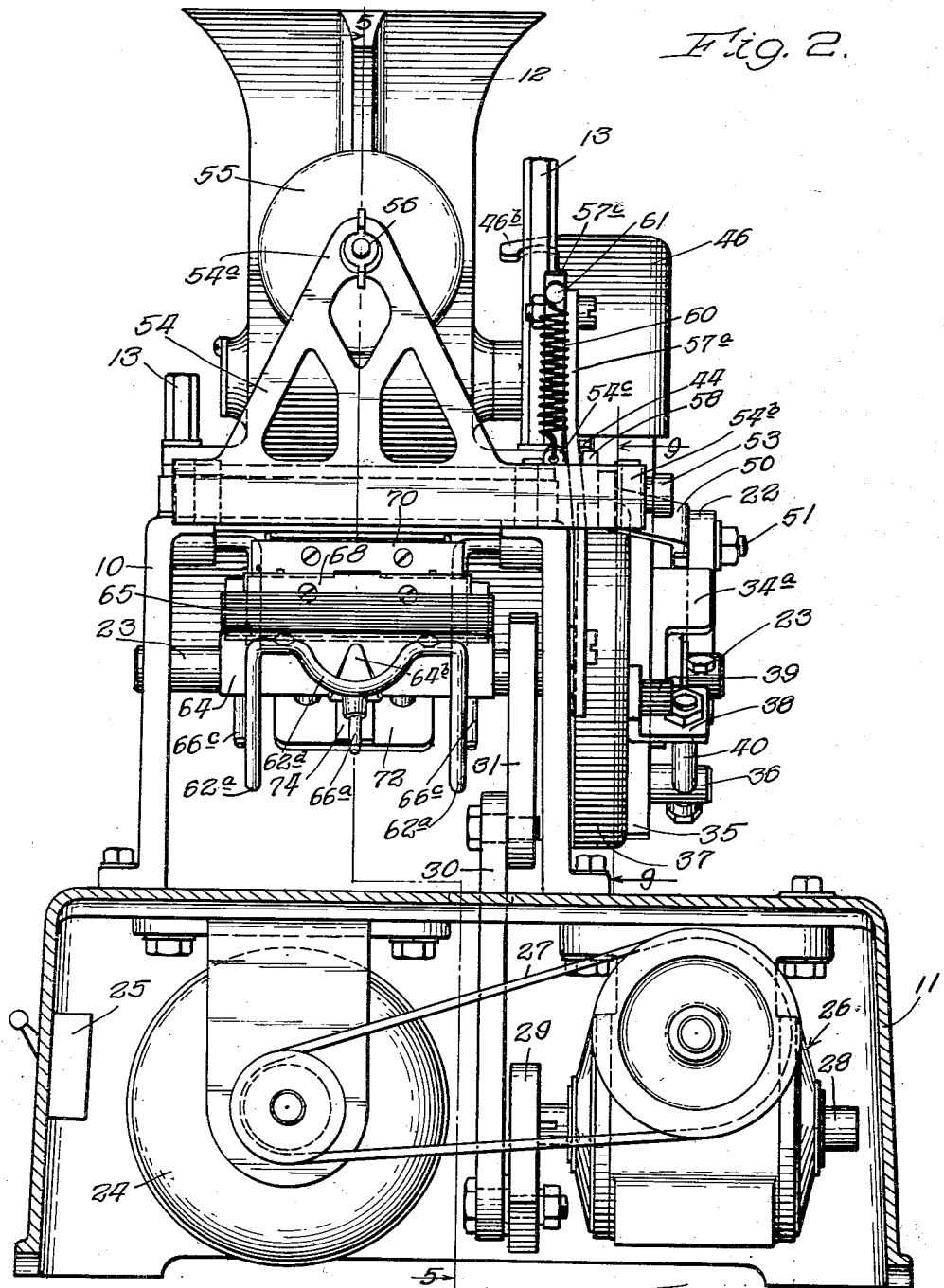
Figure 2 is an end elevation of the apparatus of Figure 1 taken from the left hand end thereof and with the lower casing shown in sectional elevation taken substantially along the line 2—2 of Figure 1.

The feeder shaft 20 has attached thereto a circular gear 43 which engages a second circular gear 44 on the second feeder shaft 21. The first circular gear 43 is held in place on the shaft 20 by the gear 42 being fastened to this shaft. The second gear 44 and thus the shaft 21 and feeder 19 are held in place by a disc 45 on the shaft 20 and overlapping the edge of the second gear 44. This construction greatly simplifies the mounting of the gears, shafts and feeders and makes it much easier to disassemble the machine for cleaning purposes. In order to prevent accidental engagement of foreign objects with the gearing there is provided a shield 46 having the shape of an elongated inverted cup. This shield is hingedly attached to the casing 10 by means of a bolt 47 at the rear lower edge of the shield with this bolt being attached to the casing 10. The shield is rotatable about this bolt. The rear lower edge of the shield 46 adjacent to the bolt 47 is provided with a rearwardly extending flange portion 46a by means of which the shield 46 may be rotated rearwardly around the hinged bolt 47 to expose the gears. The shield is held in its normal gear enclosing position by means of an inwardly extending ear 46b at the upper front edge of the shield adapted to engage a bolt 13 in the manner shown in Figs. 2 and 3.

As can be seen in Figs. 1 and 5 where the apparatus is arranged with the mold plate in completely retracted position and the feeders 18 and 19 in the positions shown, the lever 22 is to the right (Fig. 1) and the gear segment 35b engages the gear segment 42b. As the gear segment 35b is a relatively small segment of the gear 35 and as the gear segment 42b is a relatively large segment of the gear 42, rotation of the gear 35 in a counterclockwise direction as shown in Fig. 1 will cause clockwise rotation of the gear 42. This will rotate the feeders 18 and 19 away from the exit opening 16a. This movement will become quite rapid when the large radius gear segment 35a engages the small radius gear segment 42a.

The above described counterclockwise rotation of the gear 35 is brought about by the lever 22 engaging the flange 34a on the small plate 34. This flange, therefore, in effect, ties the lever 22 to the gear 35 in moving the feeders 18 and 19 from their positions adjacent to the opening 16a as shown in Fig. 5 toward the positions shown in Fig. 6 when the feeders are spaced from the exit opening 16a.

Figure 4:
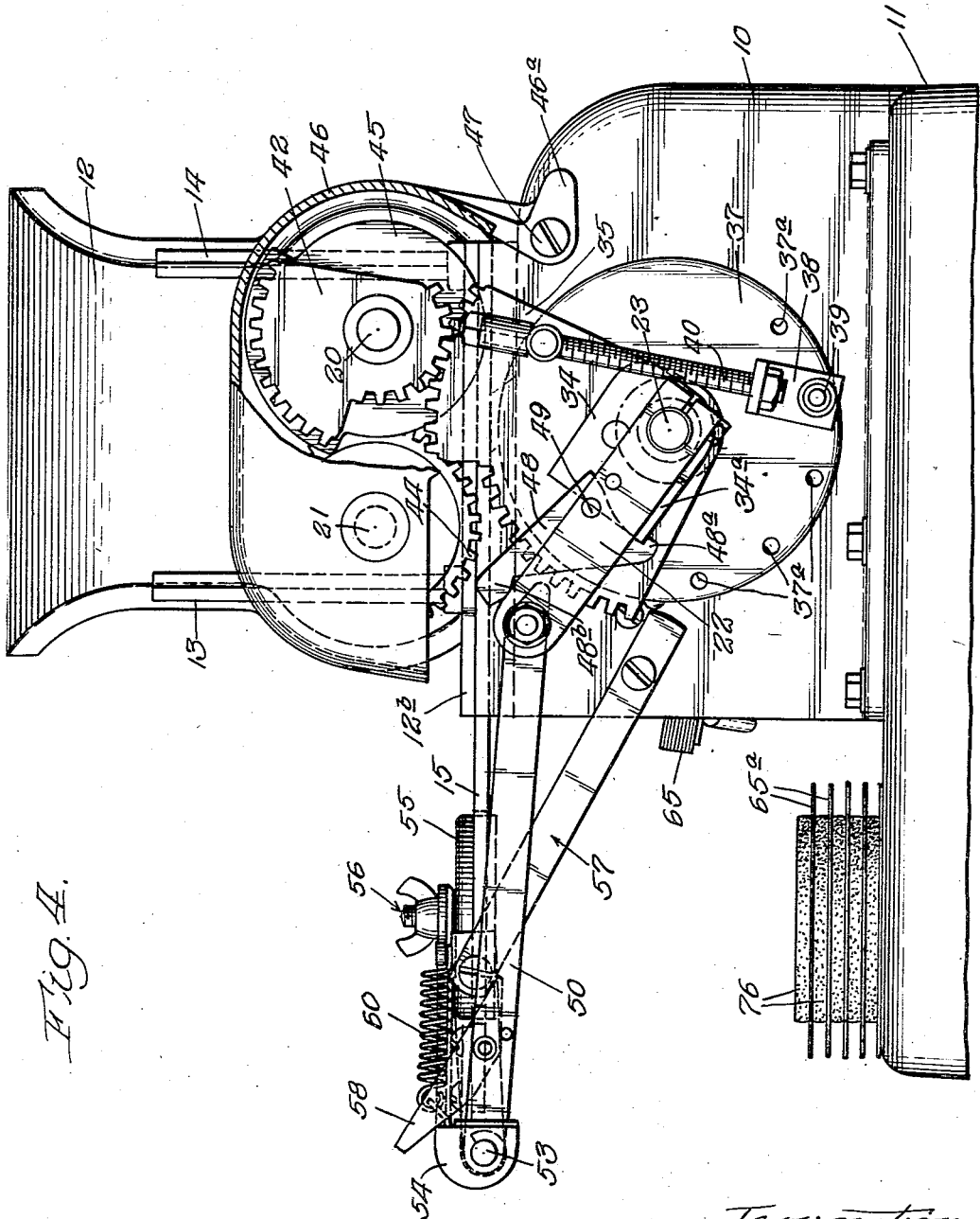
Figure 4 is a side elevational view somewhat similar to Figure 1 but with the mold plate shown in substantially fully extended position.

Movement of the lever 22 in the opposite direction or clockwise from the position shown in Fig. 4 causes the feeders to move from their positions shown in Fig. 6 toward the positions shown in Fig. 5 to force material in the hopper through the exit opening 16a into the mold opening 15a. At the initial portion of this movement the lever 22 is tied to the plate 34 by means of a weighted catch 48 rotatable about a fulcrum pin 49 located adjacent to the lower portion thereof. This catch is rotatable on the lever 22 and is provided with a downwardly extending lip 48a adapted to engage the upper edge of the flange 34a and a weighted upper end 48b. With this arrangement the catch 48 ties the lever 22 to the plate 34 and thus to the gear 35 during the initial portion of the feeding movement only. However, as soon as the lever 22 has reach an almost vertical position the weighted end 48b of the catch 48 causes the catch to rotate about the fulcrum pin 49 to its released position as shown in Fig. 1.

Movement of the lever 22 beyond this vertical position where the catch has been released causes movement of the gear 35 to be accomplished solely through the stressed spring 32 in the spring casing 37. This spring, as has been previously described, is rotated by the oscillation of the shaft 23. When the shaft is oscillated in a clockwise direction toward the position shown in Fig. 1 the stressed spring causes oscillation of the casing 37. This, in turn, causes a corresponding movement of the gear 35 by means of the bolt 40 so that the stress on the spring operates through the gear 35, gear 42, shaft 20, gear 43, gear 44 and shaft 21 to oscillate the feeders 18 and 19. The spring force will, of course, only be applied to the rams when the rams are moved toward the exit opening 16a. The spring will thus give to accommodate resistance caused by the material within the hopper resisting the movement of the feeders. This spring tension may, of course, be varied by varying the effective length of the bolt 40 between the flange 38a and the stud 36 so as to provide most efficient filling of the mold opening 15a with material having varying grades of plasticity.

Oscillation of the lever 22 is also used to reciprocate the mold plate 15. This is accomplished by providing a linkage member 50 having one end rotatably attached to the upper end of the lever 22 by means of a bolt 51 and the other end rotatably attached to the outer end of the mold plate 15.

This outer end of the mold plate 15 is provided with a pair of brackets 52 at the edges thereof and extending beyond this end. Extending between the outer end of these brackets is an axle 53 that is rotatably engaged between linkage member 50 to reciprocate the mold plate 15. Rotatably mounted on this axle 53 is a holder 54 for a knock-out ring 55 adapted to enter the mold opening 15a and remove material therefrom. This holder 54 which is rotatably mounted on the axle 53 is provided with an extended portion 54a extending toward the hopper 12 with the innermost end of this portion adapted to have the knock-out ring 55 removably attached thereto as by a bolt and nut assembly 56. The opposite end of the member 54 which is mounted on the axle 53 is provided with an outwardly extending flange portion 54b.

Figure 3:
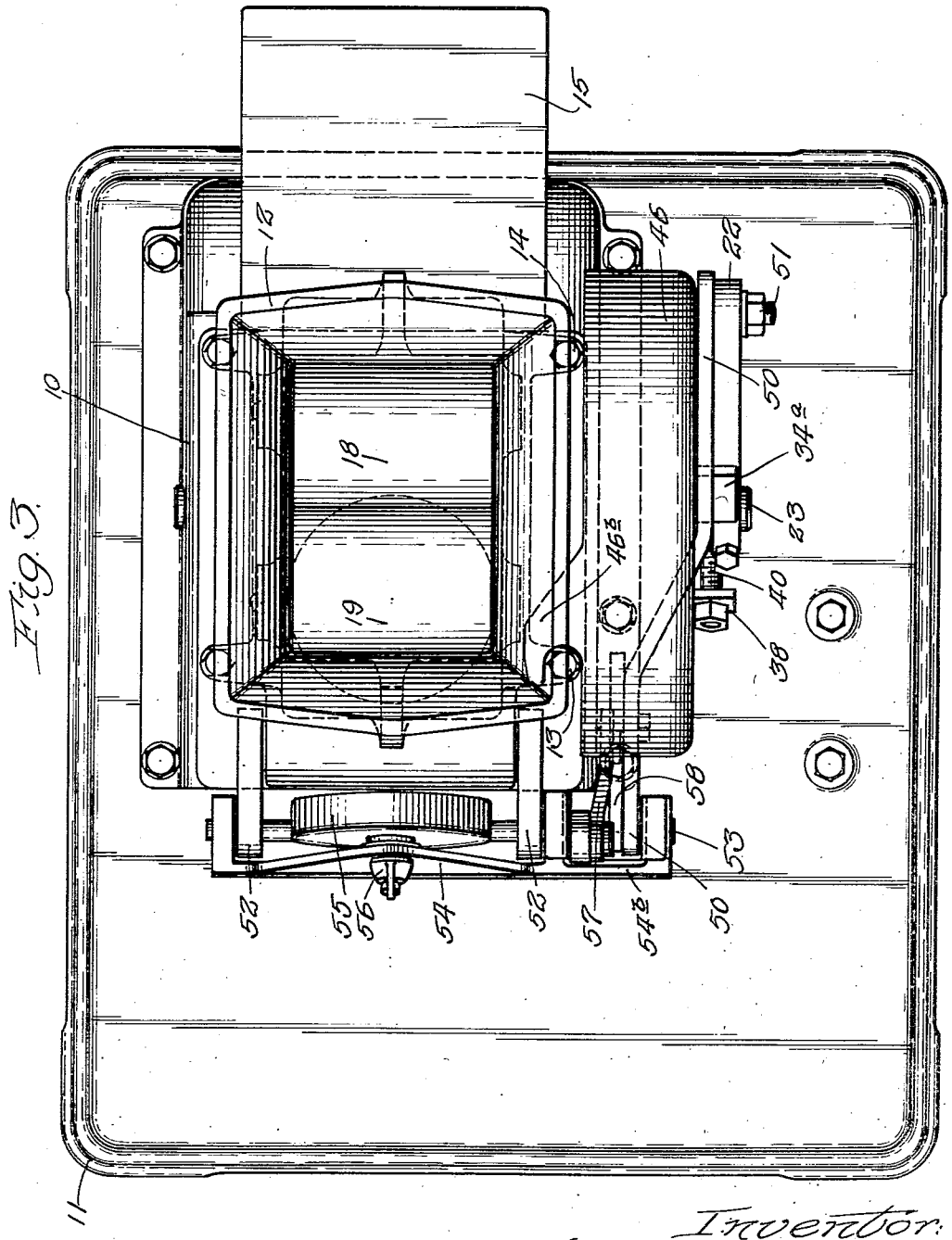
Figure 3 is a plan view of the embodiment.

In order to raise the removing member or knock-out ring 55 to the position shown in Figs. 1, 3 and 5 there is provided a toggle joint 57. One end 57a of this toggle joint is rotatably attached to the casing 10 and the other end 57b is rotatable on the axle 53 and located immediately beneath the flange 54b of the knock-out ring holder 54. The toggle joint 57 is so arranged that movement of the mold plate 15 to its retracted position with the mold opening 15a beneath the hopper exit opening 16a raises the toggle ends 57a and 57b as shown in Fig. 1. This raising of the toggle ends also raises the knock-out ring holder 54 because of the engagement of the toggle end 57b with the flange 54b.

In order to retain the knock-out ring 55 and its holder 54 in elevated position, there is provided a catch member 58 rotatably mounted on the linkage member 50 which moves the mold plate 15. This catch member is mounted for rotation about a bolt 50a and is so proportioned that the heavy end of the catch member is beyond this bolt and rests against the flange 54b. The catch member has its outer end so positioned that it drops down behind the knock-out ring holder flange 54b when this flange has reached the position shown in Fig. 1 so that the holder and ring are in operative position and do not fall when the mold plate starts to move in the opposite direction. With this movement the flange 54b is released by the toggle joint end 57b.

In order to disengage the catch member 58 from the flange 54b and permit the knock-out ring to fall downwardly and knock the material from within the mold opening 15a there is provided an arrangement whereby the upper end of the toggle member 57a engages the light end of the catch member 58. This rotates the catch member in a clockwise direction as shown in Fig. 4 in order that the flange 54b will be released. As soon as this flange is released, the knock-out ring holder 54 and thus the ring 55 falls forwardly so that the ring enters the opening 15a to knock molded material therefrom. The fall of this holder and ring is cushioned by means of a rubber button 59 attached to the inner surface of the holder 54. The parts of the device are so arranged that this action occurs when the mold opening has been moved from its first position illustrated in Fig. 5 where it receives material from the hopper to its second position illustrated in Fig. 6 where the molded material is removed from the opening.

In order to accelerate the downward movement of the knock-out ring 55 and thus give the material within the opening a sharp rap so that the material will be removed cleanly, there is provided a helical tension spring 60 extending between a pin 61 on the toggle member 57b and a piece 54c on the holder 54. With this arrangement the spring is under tension when the holder 54 is in elevated position and the ring is snapped sharply downwardly to remove the molded material from the opening 15a as soon as the catch member 58 releases the holder 54.

Located within the housing 10 is the separator sheet feed for the apparatus. These separator sheets are ordinary sheets of thin, moisture-resistant paper and are adhered to the bottom of the mold plate 15 so as to extend across the mold opening in contact with the bottom surface of the material within the opening. Ordinarily where ground meat is being molded there will be sufficient meat juices on the bottom surface of the mold plate to provide the necessary adhesion. Other adhering means may of course be used, as, for example, the sticky tape disclosed in my copending application Serial No. 185,243 filed September 16, 1950, now Patent 2,684,501, dated July 27, 1954.

In the molding apparatus shown in the drawings, the forward end of the casing 10 is open. Located within the casing 10 is an elongated generally U-shaped arm 62 having its inner ends rotatably attached to a pair of brackets 63 formed on the inner surface of the top part of the casing 10. This arm 62 has downwardly bent side portions 62a extending beneath the shaft 23 while the outer ends of the arm are substantially parallel and extend generally upwardly as illustrated by the portions 62b. The front transverse end portion 62c of the arm is provided with a downwardly extending curved part 62d. The parallel forward portions 62b are adapted to releasably support a platform 64 removably supporting a stack of separator sheets 65.

The U-shaped arm 62 is constantly urged upwardly by means of a pair of springs 62e attached to both sides of the arm adjacent the rear thereof and also attached to the bottom surface of the top part 10b of the casing 10.

The platform 64 may be removed from the side portions 62b of the arm 62 by merely grasping the front edge of the platform and pulling it forward. However, this is not necessary in applying a new stack 65 of separator sheets to the platform. Thus, the stack of separator sheets is held on the platform by means of a paper retaining member 66 made of heavy wire or the like. This retaining member includes a centrally disposed pin portion 66a adapted to extend through an opening at the rear edge of the stack, an upper portion 66b adapted to engage the top rear part of the stack and a rear portion including a pair of downwardly extending pins 66c at the sides of the retaining member adapted to engage the rear edges of the stack and platform on either side of the center pin portion 66a. As is shown in the drawings the center pin portion is adapted to be held in a hole in a downwardly extending part 64a of the platform 64.

In order to guide the center pin portion 66a into the platform hole, the platform is preferably provided with a centrally longitudinally arranged and downwardly extending groove 64b extending from the front edge of the platform to the hole in the part 64a. Thus, when it is necessary to replenish the paper with a new stack the arm 62a is grasped at the further end 62d and rotated downwardly. The retaining member 66 is then removed and the center pin portion 66a extended through the rear hole in the stack and the side portions 66c arranged at the rear edge of the stack. The assembly of stack and retaining member is then placed on the platform with the center pin 66a in the groove 64b. The assembly is then moved rearwardly on the platform until the center pin 66a drops into the hole in the platform part 64a and the pins 66c are arranged in the positions shown in the drawings.

In order to remove separator sheets in series from the stack 65 and apply them to the bottom of the mold plate 15 across the bottom of the mold opening 15a, there is provided a friction means comprising a pair of spaced brackets 67 mounted on the oscillatable shaft 23 for rotation relative thereto. Each bracket is provided with an upwardly and forwardly extending arm 67a having a friction strip 68 such as a rubber strip held in a backing member 69 extending between the arms 67a. The strip 68 bears against the topmost sheet 65a on the stack 65 of separator sheets.

The brackets 67 are arranged substantially parallel to each other and adjacent to opposite edges of the stack 65. Each bracket 67 is provided with a step 67b spaced forwardly of its rear edge with these steps adapted to engage a cross bar 70 hingedly mounted by means of a pair of legs 70a to brackets on the top inner surface of the casing 10. This cross bar 70 and legs 70a are substantially aligned with the upper edge of each bracket 67 when the cross bar is in engagement with the steps 67b as shown in Fig. 5. In order to hold these steps against the cross bar 70 there are provided a pair of tension springs 71 extending between the cross bar 70 and the backing member 69. With this construction the counterclockwise movement of the brackets 67 as shown in Fig. 5 is limited by the engagement of the steps 67b with the cross bar 70 so that the platform 64 with its stack of separator sheets is retained in a position beneath and spaced from the mold plate 15 as shown in Fig. 5.

Mounted on the oscillatable shaft 23 for movement therewith is the catch member 72. This catch member is locked to the shaft 23 between the brackets 67 by means of bolts 73 extending through the shaft and the catch member. The bolt is provided with a nut 73a at one end thereof and is provided with a collar 73b between the catch member 72 and the shaft 23.

The catch member 72 is provided with a leaf spring 74 attached to the inner surface thereof but with the outer portion of this leaf spring being movable forwardly and rearwardly relative to the catch member. This leaf spring is located between side pieces 72a on the catch member and is adapted to be movable relative to a middle portion 72b on the catch member. The position of the top part of the leaf spring 74 relative to this middle portion 72b is adjusted by means of a knurled screw 75 engaging the middle portion 72b and bearing against this upper end part of the leaf spring 74. The leaf spring 74 extends upwardly a distance just sufficient to engage the bottom of the cross bar 70 and raise it from the steps 67b when the shaft 23 and the attached catch member 72 and spring 74 are rotated in a clockwise direction from the position shown in Fig. 5. When this occurs the spring 74 passes beneath the cross bar 70. On the return trip of the spring 74 and associated parts, the spring, being flexible can pass beneath the cross bar 70.

In order to rotate the bracket 67 in a clockwise direction as shown in Fig. 5 in returning the parts to the positions shown in Fig. 5 the catch member 72 is provided with substantially radially extending side portions 72c adapted to engage the rear edges 67c of the bracket 67.

With the construction of a separator sheet feed as described and with the mold plate in retracted position as shown in Fig. 5 where the mold opening 15a is beneath the hopper exit opening 16a, the brackets 67 are held immovable by means of the springs 71 urging the brackets 67 in a counterclockwise direction so as to hold the step 67b against the cross bar 70. When the oscillatable shaft 23 is oscillated in a clockwise direction as shown in Fig. 5 either by means of the hand lever or by the illustrated motor drive, the catch member 72 is rotated in a clockwise direction. During this rotation the top of the leaf spring 74 engages the bottom edge of the cross bar 70 and lifts this bar from engagement with the steps 67b. When this occurs the springs 71 rotate the brackets 67 in a counterclockwise direction as shown in Fig. 5 so that the platform 64 is moved upwardly under the urging of the springs 62e. This upward movement to the position shown in Fig. 6 causes the extended edge portion of a topmost sheet 65a on the stack 65 to contact the bottom surface of the mold plate 15 adjacent to the leading edge of the mold opening 15a during the movement of this opening away from the position shown in Fig. 5 to its second position shown in Fig. 6 where the material within the opening is removed therefrom. The natural adhesiveness of the bottom surface of the plate or additional adhesive means as explained in my above mentioned Patent 2,684,501, is sufficient to draw this topmost sheet from the stack and extend it across the bottom of the pattie within the mold opening. The upward pressure of the stack 65 of sheets against the bottom of the mold plate serves to attach the topmost sheet to the bottom of the mold plate and the bottom of the pattie. This action occurs when the mold opening passes over the stack. When these patties are removed they fall onto the upper surface of the casing 11 with each adjacent pattie 76 separated by a sheet. As can be seen, each pattie 76 is uniform in thickness and is prevented from sticking to adjacent patties by these separator sheets.

With the parts in the position shown in Fig. 8 the mold plate 15 continues to move forward until it withdraws the topmost sheet from the stack of separator sheets. The platform and associated parts maintain the positions shown in Fig. 8 until the mold opening has passed completely beyond the stack 65 of separator sheets. When this has occurred, further movement of the shaft 23 in the same forward direction causes the side portions 72c of the catch member 72 to engage the rear edges 67c of the brackets 67. This rotates the brackets 67 in a clockwise direction and causes the friction strip 68 to move forwardly with respect to the platform 64 and stack 65 to project the leading edge of the topmost sheet 65a from the stack as is shown in Fig. 6. This further movement and further clockwise rotation of the bracket 67 also moves these members against the urging of the springs 71 until the cross bar 70 can drop behind the steps 67b. This movement also causes the brackets 67 to press the platform downwardly to its lowermost position as shown in Fig. 6. At this time the oscillatable shaft 23 has been oscillated to its greatest extent in a clockwise direction. Reverse rotation in a counterclockwise direction returns the catch member 72 and leaf spring 74 to their initial positions. This return of the leaf spring 74 does not serve to dislodge the cross bar 70 from the steps 67b because the leaf spring can yield when moving in this direction and pass beneath the cross bar 70. As soon as the spring has gone beyond the cross bar it immediately springs back into its normal position.

With the molding apparatus in the position shown in Figs. 1 and 5 and the hopper 12 full of ground meat or other moldable material and the mold opening 15a also full of moldable material operation of the device through one cycle is as follows.

Movement of the member shaft 23 and the member 22 in a counterclockwise direction as viewed in Figure 1 causes similar movement of the member 34, gear 35 and gear 42. These movements are brought about by the engagement of the member 22 with the flange 34a. These movements of the gears 35 and 42 act through gears 43 and 44 and shafts 20 and 21 to rotate the feeders 18 and 19 away from their positions adjacent to the feed exit 16a and toward the positions shown in Fig. 6. The movement of the member 22 and shaft 23 in a counterclockwise direction also moves the mold plate 15 from its retracted position to its extended position as shown in Fig. 6. As explained above, the knock-out ring 55 and its holder 54 have already been moved to their uppermost positions and are retained in this position by the catch member 58 until the plate has approached its fully extended position. At this time the catch member 58 is moved from engagement with the holder 54 so that the ring 55 falls into the mold opening 15a as shown in Fig. 6 and removes the pattie therefrom, all as explained in greater detail above.

Movement of the oscillatable member 22 and the shaft 23 in this counterclockwise direction as viewed in Fig. 1 (clockwise as viewed in Figs. 5, 6 and 8) also rotates the catch member 72 and leaf spring 74 to release the cross bar 70 from steps 67b. As soon as this cross bar has been released, the springs 71 rotate the brackets 67 and attached friction strip 68 upwardly and rearwardly to permit the arm 62 to rise under the urging of springs 62e. This raising of the arms 62 raises the platform 64 and the stack 65 of separator sheets thereon so that the leading edge of the topmost sheet 65a is pressed against the bottom of the mold plate 15 immediately in front of the mold plate opening 15a as shown in Fig. 8. The continued forward movement of the mold plate 15 from the position shown in Fig. 8 draws this topmost sheet from the stack 65 to adhere it across the mold opening and adhere it to the bottom surface of the mold plate. This action occurs while the mold opening 15a is traversing the platform 64 and moving toward the fully extended position.

Further movement of the shaft 23 in this direction causes the side portions 72c of the catch member to engage the rear edges 67c of the brackets 67 and return the platform 64 to the position shown in Fig. 5 with the bar 70 in engagement with the steps 67b, all as described above.

With the mold plate in fully extended position and the movable member 22 and shaft 23 moved forwardly through one half of the oscillation cycle, movement of these members in the opposite direction or from the position shown in Figs. 4 and 6 to the position shown in Fig. 1 and Fig. 5, moves the plate 34 and gear 35 rearwardly. The catch 48 ties member 22 and thus shaft 23 to the gear 35 and thus gear 42 until the member 22 has reached a substantially vertical position. Then the weighted end 48b of the catch 48 causes release of the member 22 from the plate 34. Continued movement of the shaft 23 then acts through the coil spring 32 to rotate the housing 37 in the same direction. The spring, therefore, which has a predetermined tension thereupon acts through the bolt 40 to cause similar movement of the gears 35 and 42 and rotate the feeders 18 and 19 toward the hopper exit opening 16a. However, when the feeders 18 and 19 meet sufficient resistance within the hopper 12 the spring will yield so that the mold opening 15a will not be packed tighter than desired and so that the operating parts will not be damaged. Thus, the force exerted by the feeders against the resistance of the material within the hopper will depend upon the preset tension in the spring. As was pointed out above, this tension may be changed by locating the pin 39 in a desired hole 37a and by regulating the effective length of the adjustment bolt 40. Where the material to be molded is relatively fluid this tension will be correspondingly light so that the fluid material will not be forced out the bottom of the hopper around the joints therein. Conversely, when the material is relatively stiff and less fluid then tension in the spring will be correspondingly greater. It is to be understood, of course, that when the member 22 moves away from the flange 34a this movement itself sets up some additional force in the spring as the inner end of the spring is attached to the axle 23 which, in turn, is attached to the member 22.

Movement of the axle 23 and member 22 in this clockwise direction as shown in Fig. 4 also moves the mold plate 15 from its extended position to its retracted position and simultaneously raises the knock-out ring 55 and holder 54 from the position shown in Fig. 4 to the elevated position shown in Fig. 1. Once again the catch member 58 drops into place to engage the flange 54b and hold the knock-out ring in elevated position. Similarly, further movement of the member 22 and shaft 23 causes the paper feed mechanism to be returned to the positions shown in Fig. 5. As explained above the brackets 67 have already been moved so that the steps 67b engage the cross bar 67 to retain the paper feed mechanism in the Fig. 5 position.

Having described my invention as related to the embodiment shown in the drawings, it is my intention that the invention be not limited by any of the details of description unless otherwise specified, but rather be construed broadly within its spirit and scope as set out in the accompanying claims.

I claim:

1. In a device for applying a separator sheet to a portion of plastic material, apparatus comprising: a mounting means operably supporting the plastic material portion; a platform on the mounting means adjacent to the plastic material portion and adapted releasably to support a stack of separator sheets; an elongated arm attached to the platform and hingedly attached to the mounting means, the arm being oscillatable about its hinge in moving the platform toward and away from the plastic material portion; a movable friction member on the mounting means bearing against a topmost separator sheet on the supporting member; means operably associated with the platform and urging the platform toward the plastic material portion; means operably associated with the friction member for moving the friction member and thus the platform away from the plastic material portion and simultaneously to move the topmost sheet forwardly into edge projecting position; and means operably associated with the mounting means releasing the friction member to permit the platform and arm to move toward the plastic material portion about said hinge and contact said sheet thereagainst.

2. In a device for applying a separator sheet to a portion of plastic material, apparatus comprising: a mounting means supporting the plastic material portion; a platform adjacent to the plastic material portion and adapted releasably to support a stack of separator sheets adjacent to the plastic material portion; an elongated arm attached to the platform and hingedly attached to the mounting means, the arm being oscillatable in moving the platform toward and away from the plastic material portion; an oscillatable friction member bearing against a topmost separator sheet on the supporting member, the friction member having its axis of oscillation located between the supporting member and the arm hinge; means urging the platform toward the plastic material portion; means operably supported by the mounting means for oscillating the friction member to move the platform away from the plastic material portion and move the topmost sheet forwardly into edge projecting position; and means operably supported by the mounting means releasing the friction member to permit the platform to move toward the plastic material portion and contact the leading edge of the sheet thereagainst.

3. In a device for applying a separator sheet to a portion of plastic material carried by a transfer device, apparatus comprising: a mounting means supporting the transfer device; a platform adjacent to the transfer device and adapted releasably to support a stack of separator sheets adjacent to the transfer device; an elongated arm attached to the platform and hingedly attached to the mounting means, the arm being oscillatable in moving the platform toward and away from the transfer device; means operably attached to the platform urging the platform toward the transfer device; an oscillatable member adjacent to said platform; means operably supported by the mounting means for simultaneously moving the transfer device and oscillating said oscillatable member; a friction member operably mounted on the mounting means for rotation relative to the oscillatable member and bearing against the topmost sheet on the supporting member; and means operably supported by the mounting means retaining the friction member in a position pressing the platform into a retracted position, said retaining means being released by a release member on the oscillatable member to permit the platform to move upwardly toward the transfer device and attach said topmost sheet to the transfer device, the release member being adjustable relative to the holding means for regulating the timing of said releasing relative to the movement of the transfer device, said movement of the transfer device serving to withdraw said attached topmost sheet from the platform.

4. In a device for applying a separator sheet to a plastic material carried by a transfer device, apparatus comprising: a mounting means supporting the transfer device; a platform adjacent to the transfer device and adapted releasably to support a stack of separator sheets adjacent to the transfer device; an elongated arm attached to the platform and hingedly attached to the mounting means, the arm being oscillatable in moving the platform toward and away from the transfer device; means operably attached to the platform urging the platform toward the transfer device; an oscillatable member adjacent to said platform; means operably supported by the mounting means for simultaneously moving the transfer device and oscillating said oscillatable member; a friction member including a bracket operably mounted on said mounting means for rotation relative to the oscillatable member and bearing against the topmost sheet on the supporting member; a catch member operably mounted on the mounting means engaging a catch portion on said bracket for holding the friction member in a position pressing the platform into a retracted position; a release member mounted for movement with the oscillatable member engaging and releasing said catch member from said catch portion to permit the platform to move upwardly toward the transfer device and attach said topmost sheet to the transfer device; and means for adjusting the position of the release member relative to the catch member for regulating the timing of said releasing relative to the movement of the transfer device, said movement of the transfer device serving to withdraw said attached topmost sheet from the platform.

5. In a device for applying a separator sheet to a plastic material carried by a transfer device, apparatus comprising: a mounting means supporting the transfer device; a platform adjacent to the transfer device and adapted releasably to support a stack of separator sheets adjacent to the transfer device; an elongated arm attached to the platform and hingedly attached to the mounting means, the arm being oscillatable in moving the platform toward and away from the transfer device; means operably attached to the platform urging the platform toward the transfer device; an oscillatable member adjacent to said platform; means operably supported by the mounting means for simultaneously moving the transfer device and oscillating said oscillatable member; a friction member including a side bracket operably mounted on said mounting means for rotation relative to the oscillatable member and bearing against the topmost sheet on the supporting member; a catch member operably mounted on the mounting means engaging a catch portion on said bracket for holding the friction member in a position pressing the platform into a retracted position; a release member mounted for movement with the oscillatable member engaging and releasing said catch member from said catch portion when the oscillatable member is moved in one direction to permit the platform to move upwardly toward the transfer device and attach said topmost sheet to the transfer device and being distortable to move by the catch member when the oscillatable member is moved in the opposite direction; and means for adjusting the position of the release member relative to the catch member for regulating the timing of said releasing relative to the movement of the transfer device, said movement of the transfer device serving to withdraw said attached topmost sheet from the platform.

6. In a device for applying a separator sheet to a plastic material carried by a transfer device, apparatus comprising: a mounting means supporting the transfer device; a platform adjacent to the transfer device and adapted releasably to support a stack of separator sheets adjacent to the transfer device; an elongated arm attached to the platform and hingedly attached to the mounting means, the arm being oscillatable in moving the platform toward and away from the transfer device; means operably attached to the platform urging the platform toward the transfer device; an oscillatable member adjacent to said platform; means operably supported by the mounting means for simultaneously moving the transfer device and oscillating said oscillatable member; a friction member including a side bracket operably mounted on said mounting means for rotation relative to the oscillatable member and bearing against the topmost sheet on the supporting member; a catch member operably mounted on the mounting means engaging a catch portion on said bracket for holding the friction member in a position pressing the platform into a retracted position; a release member including a leaf spring mounted for movement with the oscillatable member engaging and releasing said catch member from said catch portion when the oscillatable member is moved in one direction to permit the platform to move upwardly toward the transfer device and attach said topmost sheet to the transfer device and being distortable to move by the catch member when the oscillatable member is moved in the opposite direction; and an adjusting screw between the oscillatable member and leaf spring for adjusting the position of the spring relative to the catch member for regulating the timing of said releasing relative to the movement of the transfer device, said movement of the transfer device serving to withdraw said attached topmost sheet from the platform.

7. In a device for applying a separator sheet to a plastic material carried by a transfer device, apparatus comprising: a mounting means supporting the transfer device; a platform adjacent to the transfer device and adapted releasably to support a stack of separator sheets adjacent to the transfer device; means operably carried by the mounting means urging the platform toward the transfer device, said platform being movable toward and away from the transfer device; an oscillatable member adjacent to said platform; means operably supported by the mounting means for simultaneously moving the transfer device and oscillating said oscillatable member; a friction member operably mounted on said mounting means for rotation relative to the oscillatable member and bearing against the topmost sheet on the supporting member; and means operably supported by the mounting means holding the friction member in a position pressing the platform into a retracted position and engaged by a release member on the oscillatable member for releasing said holding means to permit the platform to move upwardly and contact the transfer device and attach said topmost sheet to the transfer device, the release member being adjustable relative to the holding means for regulating the timing of said releasing relative to the movement of the transfer device, said movement of the transfer device serving to withdraw said attached topmost sheet from the platform.

8. In a device for applying a separator sheet to a plastic material carried by a transfer device, apparatus comprising: a mounting means supporting the transfer device; a platform adjacent to the transfer device and adapted releasably to support a stack of separator sheets adjacent to the transfer device; means operably carried by the mounting means urging the platform toward the transfer device and said platform being movable toward and away from the transfer device; an oscillatable member adjacent to said platform; means operably supported by the mounting means for simultaneously moving the transfer device and oscillating said oscillatable member; a friction member including a side bracket operably mounted on said mounting means for rotation relative to the oscillatable member and bearing against the topmost sheet on the supporting member; a catch member operably mounted on the mounting means engaging a catch portion on said bracket for holding the friction member in a position pressing the platform into a retracted position; a release member including a leaf spring mounted for movement with the oscillatable member engaging and releasing said catch member from said catch portion when the oscillatable member is moved in one direction to permit the platform to move upwardly and contact the transfer device and attach said topmost sheet to the transfer device and being distortable to move by the release member when the oscillatable member is moved in the opposite direction; and an adjusting screw between the oscillatable member and leaf spring for adjusting the position of the spring relative to the catch member for regulating the timing of said releasing relative to the movement of the transfer device, said movement of the transfer device serving to withdraw said attached topmost sheet from the platform.

References Cited in the file of this patent

UNITED STATES PATENTS

| | | |
|---|---|---|
| 283,906 | Lauten | Aug. 28, 1883 |
| 635,616 | Trevette | Oct. 24, 1899 |
| 749,113 | Sternberg | Jan. 5, 1904 |
| 2,391,125 | Carpenter | Dec. 18, 1945 |
| 2,530,061 | Holly | Nov. 14, 1950 |
| 2,530,062 | Holly | Nov. 14, 1950 |
| 2,554,821 | Garfunkel | May 29, 1951 |
| 2,706,830 | Holly | Apr. 26, 1955 |

FOREIGN PATENTS

| | | |
|---|---|---|
| 335,765 | Germany | Apr. 9, 1921 |